(12) United States Patent
Matsumoto (10) Patent No.: US 10,165,433 B2
(45) Date of Patent: Dec. 25, 2018

(54) USER TERMINAL AND PROCESSOR

(71) Applicant: KYOCERA CORPORATION, Kyoto (JP)

(72) Inventor: Naohisa Matsumoto, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 148 days.

(21) Appl. No.: 15/308,945

(22) PCT Filed: May 8, 2015

(86) PCT No.: PCT/JP2015/063375
§ 371 (c)(1),
(2) Date: Nov. 4, 2016

(87) PCT Pub. No.: WO2015/170765
PCT Pub. Date: Nov. 12, 2015

(65) Prior Publication Data
US 2017/0078866 A1    Mar. 16, 2017

Related U.S. Application Data (60) Provisional application No. 61/990,988, filed on May 9, 2014.

(51) Int. Cl.
| | |
|---|---|
| *H04W 4/00* | (2018.01) |
| *H04W 8/00* | (2009.01) |
| *H04W 72/04* | (2009.01) |
| *H04W 92/18* | (2009.01) |
| *H04L 1/18* | (2006.01) |
| *H04L 5/00* | (2006.01) |
| *H04W 48/08* | (2009.01) |
| *H04W 88/06* | (2009.01) |

(52) U.S. Cl.
CPC ........... *H04W 8/005* (2013.01); *H04L 1/1893* (2013.01); *H04L 5/0051* (2013.01); *H04W 8/00* (2013.01); *H04W 48/08* (2013.01); *H04W 72/04* (2013.01); *H04W 92/18* (2013.01); *H04W 88/06* (2013.01)

(58) Field of Classification Search
CPC ..... H04W 8/005; H04W 48/08; H04W 72/04; H04W 92/18; H04W 8/00; H04W 88/06; H04L 5/0051; H04L 1/1893
USPC .......................................... 370/329
See application file for complete search history.

(56) References Cited

U.S. PATENT DOCUMENTS

2012/0113938 A1* 5/2012 Larsson .............. H04W 74/008
370/329

OTHER PUBLICATIONS

Samsung, "Discovery Resource & UE-eNB Transmission in Uplink", Mar. 31-Apr. 4, 2014. (From Applicant's IDS filed on Nov. 4, 2016).*
The extended European search report issued by the European Patent Office dated Oct. 24, 2017, which corresponds to European Patent Application No. 15788564.1-1854 and is related to U.S. Appl. No. 15/308,945.

(Continued)

*Primary Examiner* — Mang Hang Yeung
(74) *Attorney, Agent, or Firm* — Studebaker & Brackett PC (57) ABSTRACT

A user terminal according to the present embodiment comprises: a controller configured to control so that a discovery signal is repeatedly transmitted by using an HARQ scheme. The discovery signal includes a demodulation reference signal. The controller unchangingly maintains a signal sequence of the demodulation reference signal, for each transmission of the discovery signal.

2 Claims, 5 Drawing Sheets

(56) References Cited

OTHER PUBLICATIONS

InterDigital; On physical channel design for D2D broadcast communication and discovery; 3GPP TSG-RAN WG1 Meeting #76bis, R1-141557; 3rd Generation Partnership Project (3GPP); Mar. 31-Apr. 4, 2014; XP050787225; Shenzhen, China.
Anonymous; Chase combining HARQ versus Incremental redundancy HARQ, Difference between Chase combining and Incremental redundancy HARQ techniques; May 5, 2013; XP055415282; Retrieved from the Internet: URL: http://www.rfwireless-world.com/Terminology/Chase-Combining-HARQ-vs-incremental-redundancy-HARQ.html.
ZTE; Initialization for DMRS in CoMP; 3GPP TSG RAN WG1 Meeting #68, R1-120304; 3rd Generation Partnership Project (3GPP); Feb. 6-10, 2012; XP050562835; Dresden, Germany.
International Search Report issued in PCT/JP2015/063375; dated Jul. 28, 2015.
Written Opinion issued in PCT/JP2015/063375; dated Jul. 28, 2015.
3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.
Ericsson; Discovery Resource Allocation; 3GPP TSG RAN WG1 Meeting #76bis; R1-141388; Mar. 31-Apr. 4, 2014; pp. 1-3; Shenzhen, China.
Samsung; Discovery Resources & UE-eNB Transmissions in Uplink; 3GPP TSG RAN WG2 Meeting #85bis; R2-141391; Mar. 31-Apr. 4, 2014; pp. 1-3; Valencia, Spain.
Ericsson; on Scrambling of D2D Physical Channels; 3GPP TSG RAN WG1 Meeting #76bis; R1-141382; Mar. 31-Apr. 4, 2014; pp. 1-4; Shenzhen, China.
Chairman; Draft Agenda; 3GPP TSG RAN WG1 Meeting #76bis; R1-141100; Mar. 31-Apr. 4, 2014; pp. 1-6; Shenzhen, China.
Qualcomm Incorporated; Reference Signal Design for Discovery; 3GPP TSG-RAN WG1 #75; R1-135324; Nov. 11-15, 2013; pp. 1-7; San Francisco, USA.

\* cited by examiner

USER TERMINAL AND PROCESSOR

TECHNICAL FIELD

The prevent application relates to a user terminal and a processor used in a mobile communication system that supports D2D proximity service.

BACKGROUND ART

In 3GPP (3rd Generation Partnership Project) which is a project aiming to standardize a mobile communication system, the introduction of Device to Device (D2D) proximity service is discussed as a new function after Release 12 (see Non Patent Document 1).

The D2D proximity service (D2D ProSe) is a service enabling direct Device-to-Device communication within a synchronization cluster including a plurality of synchronized user terminals. The D2D proximity service includes a D2D discovery procedure (Discovery) in which a proximal terminal is discovered and D2D communication (Communication) that is direct Device-to-Device communication.

PRIOR ART DOCUMENT

Non-Patent Document

Non Patent Document 1: 3GPP technical report "TR 36.843 V12.0.1" Mar. 27, 2014

SUMMARY OF THE INVENTION

Here, there is proposed a technology for randomly changing, for each transmission of a discovery signal transmitted in a D2D discovery procedure, a signal sequence of a demodulation reference signal (Data Demodulation reference signal) included in the discovery signal. Thus, it is possible to avoid a case where the same demodulation reference signal transmitted from each of a plurality of user terminals is collided continuously, resulting in an improved receiving success rate of a discovery signal.

In this case, however, a reception-side user terminal does not know the signal sequence of the demodulation reference signal, and thus, the reception-side user terminal needs to attempt to receive all the possible signal sequence patterns every time receiving a discovery signal until a demodulation reference signal is correctly received, as a result of which there is a problem that a processing load of the reception-side user terminal increases.

Therefore, an object of the present invention is to enable improvement of a receiving success rate of a discovery signal while reducing a processing load of a reception-side user terminal.

A user terminal according to an embodiment comprises: a controller configured to control so that a discovery signal is repeatedly transmitted by using an HARQ scheme. The discovery signal includes a demodulation reference signal. The controller unchangingly maintains a signal sequence of the demodulation reference signal, for each transmission of the discovery signal.

DESCRIPTION OF THE EMBODIMENT

[Overview of Embodiment]

A user terminal according to an embodiment comprises: a controller configured to control so that a discovery signal is repeatedly transmitted by using an HARQ scheme. The discovery signal includes a demodulation reference signal. The controller unchangingly maintains a signal sequence of the demodulation reference signal, for each transmission of the discovery signal.

In an embodiment, the controller determines the signal sequence of the demodulation reference signal, on the basis of a unique identifier assigned to the user terminal.

A processor according to an embodiment is provided in a user terminal. The processor executes a process of controlling so that a discovery signal is repeatedly transmitted by using an HARQ scheme. The discovery signal includes a demodulation reference signal. The processor executes a process of unchangingly maintaining a signal sequence of the demodulation reference signal, for each transmission of the discovery signal.

[Embodiment]

Hereinafter, the embodiment in a case where contents of the present application are applied to an LTE system will be described.

(System Configuration)

Figure 1:
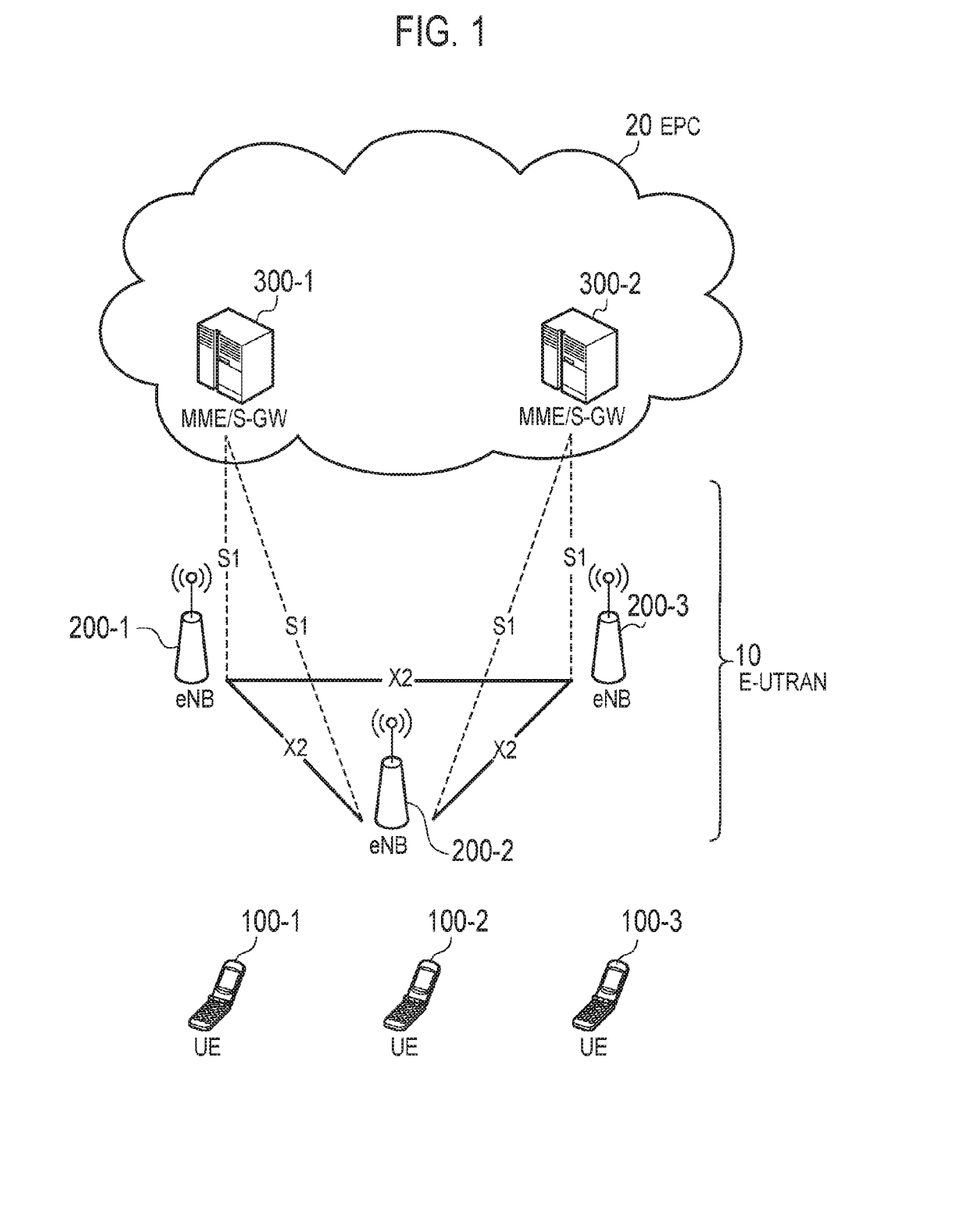
FIG. 1 is a configuration diagram of an LTE system according to an embodiment.

FIG. 1 is a configuration diagram of an LTE system according to an embodiment. As shown in FIG. 1, the LTE system according to the embodiment includes UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 100 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. A network of the LTE system (a LTE network) is configured by the E-UTRAN 10 and the EPC 20. The EPC 20 includes MME (Mobility Management Entity)/S-GW (Serving-Gateway) 300. The MME performs various mobility controls and the like, for the UE 100. The S-GW performs control to transfer user data. The MME/S-GW 300 is connected to the eNB 200 via an S1 interface.

Figure 2:
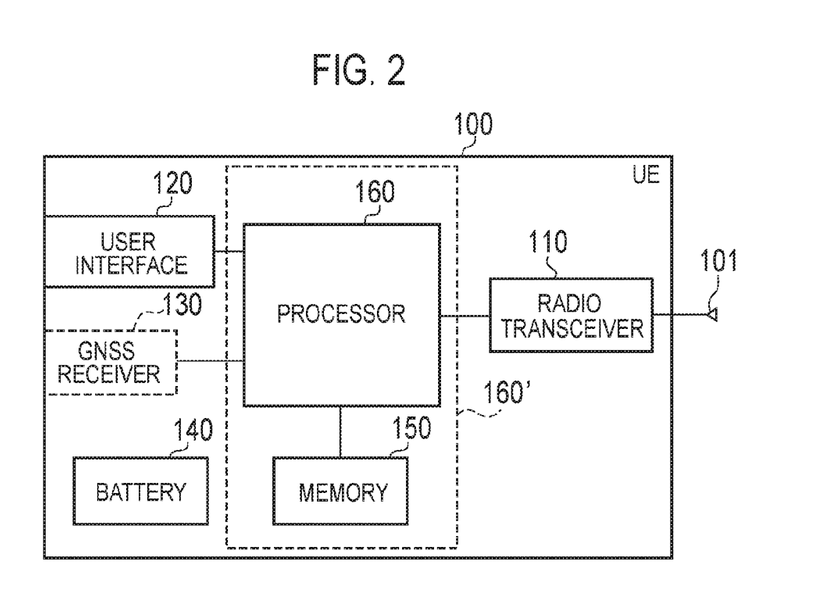
FIG. 2 is a block diagram of a UE according to the embodiment.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 corresponds to a storage, and the processor 160 corresponds to a controller. The UE 100 may not have the GNSS receiver 130. Furthermore, the memory 150 may be integrally formed with the processor 160, and this set (that is, a chip set) may be a processor 160' constituting the controller.

The antenna 101 and the radio transceiver 110 are used to transmit and receive a radio signal. The radio transceiver 110 converts a baseband signal (a transmission signal) output from the processor 160 into the radio signal, and transmits the radio signal from the antenna 101. Furthermore, the radio transceiver 110 converts a radio signal (a reception signal) received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
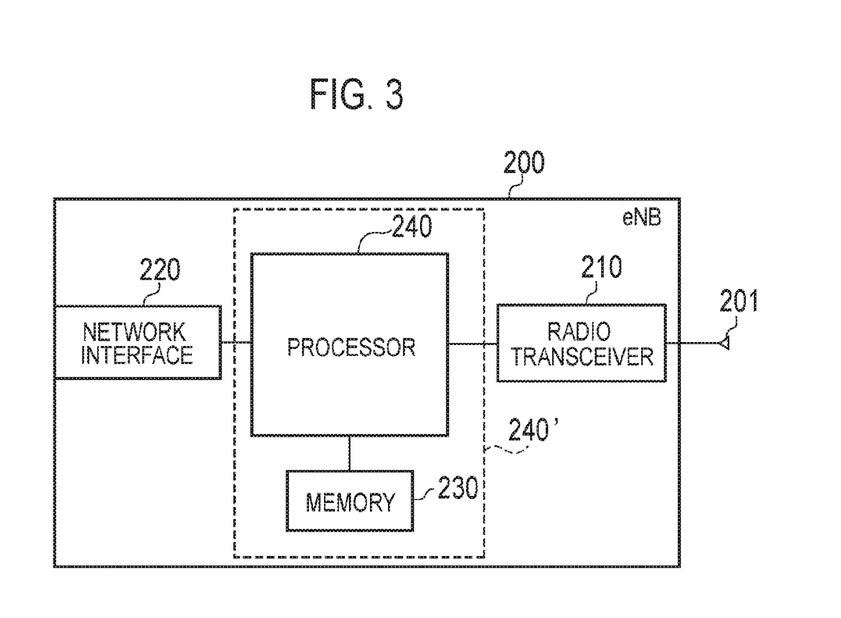
FIG. 3 is a block diagram of an eNB according to the embodiment.

FIG. 3 is a block diagram of the eNB 200. As shown in FIG. 3, the eNB 200 includes an antenna 201, a radio transceiver 210, a network interface 220, a memory 230, and a processor 240. It is note that the memory 230 may be integrated with the processor 240, and this set (that is, a chipset) may be a processor 240' constituting the controller.

The antenna 201 and the radio transceiver 210 are used to transmit and receive a radio signal. The radio transceiver 210 converts a baseband signal (a transmission signal) output from the processor 240 into the radio signal, and transmits the radio signal from the antenna 201. Furthermore, the radio transceiver 210 converts a radio signal (a reception signal) received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
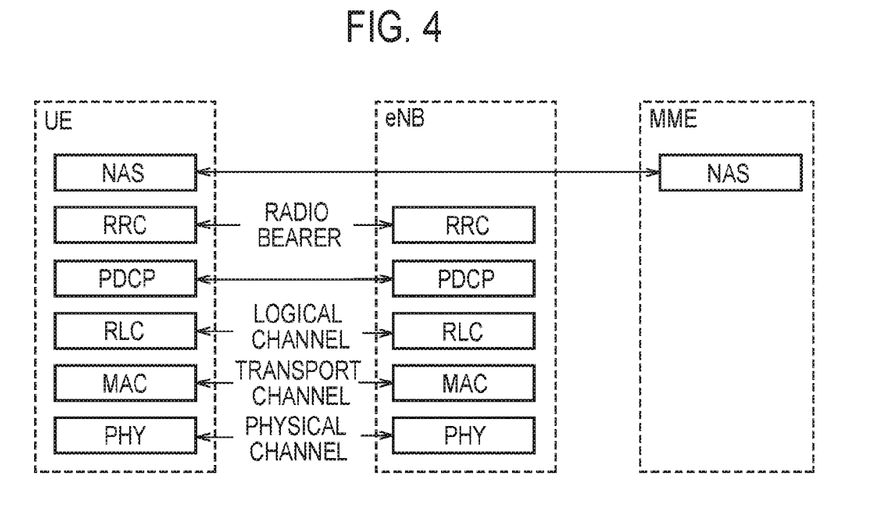
FIG. 4 is a protocol stack diagram according to the embodiment.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted through the physical channel.

The MAC layer performs priority control of data, and a retransmission process and the like by hybrid ARQ (HARQ). Between the MAC layer of the UE 100 and the MAC layer of the eNB 200, user data and a control signal are transmitted via a transport channel. The MAC layer of the eNB 200 includes a transport format of an uplink and a downlink (a transport block size, a modulation and coding scheme) and a scheduler to decide (schedule) an allocated resource block to the UE 100.

The RLC layer transmits data to an RLC layer of a reception side by using the functions of the MAC layer and the PHY layer. Between the RLC layer of the UE 100 and the RLC layer of the eNB 200, user data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state, and when the connection is not established, the UE 100 is in an RRC idle state.

NAS (Non-Access Stratum) layer positioned above the RRC layer performs session management, mobility management and the like.

Figure 5:
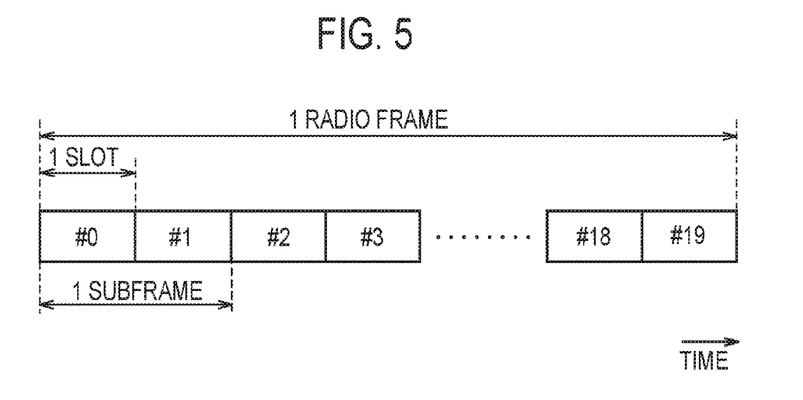
FIG. 5 is a configuration diagram of a radio frame according to the embodiment.

FIG. 5 is a configuration diagram of a radio frame used in the LTE system. In the LTE system, OFDMA (Orthogonal Frequency Division Multiplexing Access) is employed in a downlink (DL), and SC-FDMA (Single Carrier Frequency Division Multiple Access) is employed in an uplink (UL), respectively.

As shown in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol. Among radio resources allocated to the UE 100, a frequency resource is configured by a resource block and a time resource is configured by a subframe (or slot).

(D2D Proximity Service)

A D2D proximity service will be described, below. The LTE system according to an embodiment supports the D2D proximity service. The D2D proximity service is described in Non Patent Document 1, and an outline thereof will be described here.

The D2D proximity service (D2D ProSe) is a service enabling direct UE-to-UE communication within a synchronization cluster including a plurality of synchronized UEs 100. The D2D proximity service includes a D2D discovery procedure (Discovery) in which a proximal UE is discovered and D2D communication (Communication) that is direct UE-to-UE communication. The D2D communication is also called Direct Communication.

A scenario in which all the UEs 100 forming the synchronization cluster are located inside a cell coverage is called "In coverage". A scenario in which all the UEs 100 forming the synchronization cluster are located outside a cell coverage is called "Out of coverage". A scenario in which some UEs 100 in the synchronization cluster are located inside a cell coverage and the remaining UEs 100 are located outside the cell coverage is called "Partial coverage".

In "In coverage", the eNB 200 is a D2D synchronization source, for example. A D2D asynchronization source, from which a D2D synchronization signal is not transmitted, is synchronized with the D2D synchronization source. The eNB 200 that is a D2D synchronization source transmits, by a broadcast signal, D2D resource information indicating a radio resource available for the D2D proximity service. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200.

In "Out of coverage" or "Partial coverage", the UE 100 is a D2D synchronization source, for example. In "Out of coverage", the UE 100 that is a D2D synchronization source transmits D2D resource information indicating a radio resource available for the D2D proximity service, by a D2D synchronization signal, for example. The D2D synchronization signal is a signal transmitted in the D2D synchronization procedure in which a device-to-device synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information can be conveyed than the D2DSS. The PD2DSCH conveys the above-described D2D resource information (the Discovery resource information and the Communication resource information). Alternatively, when the D2DSS is associated with the D2D resource information, the PD2DSCH may be rendered unnecessary.

In the D2D discovery procedure, a discovery signal for discovering a proximal terminal (hereinafter, "Discovery signal") is transmitted. Types of the D2D discovery procedure include: a first discovery type (Type 1 discovery) in which a radio resource not uniquely assigned to the UE 100 is used for transmitting a Discovery signal; and a second discovery type (Type 2 discovery) in which a radio resource uniquely allocated to each UE 100 is used for transmitting a Discovery signal. In the second discovery type, a radio resource individually allocated to each transmission of a Discovery signal or a radio resource allocated semi-persistently is used.

(D2D Physical Channel)

Figure 6:
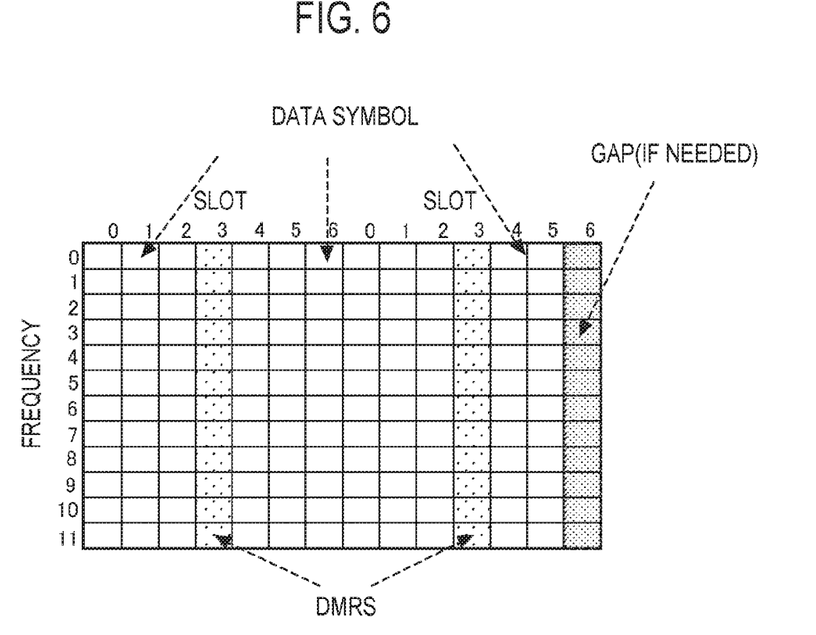
FIG. 6 is a diagram for describing a D2D physical channel according to the present embodiment.

Next, a D2D physical channel will be described by using FIG. 6. FIG. 6 is a diagram for describing the D2D physical channel according to the present embodiment.

The UE 100 can use a D2D physical channel having an RE mapping similar to an RE mapping of a PUSCH, as shown in FIG. 6, to execute the D2D proximity service (such as the D2D discovery procedure and the D2D communication).

Specifically, in the D2D physical channel, a data symbol and a demodulation reference signal (hereinafter, "DMRS: Data Demodulation reference signal") are mapped.

Further, in a final symbol of the D2D physical channel, a gap not including data information may be arranged, where necessary. For example, when the D2D physical channels are continued in a frequency direction, no gap may be arranged; when a PUSCH follows immediately after the D2D physical channel in a time direction, a gap may be arranged. As a result, no problem occurs even when collision with a cellular signal based on a timing delay of the D2D signal is generated, and as compared to a case where a gap is always arranged in the final symbol of the D2D physical channel, it is possible to effectively use the radio resource.

The signal sequence of a DMRS may be determined by the UE 100 before starting a transmission of a Discovery signal. For example, the UE 100 uses the unique identifier assigned to the UE 100 to determine a cyclic shift for generating the signal sequence of a DMRS. As a result, the signal sequence of a DMRS is determined. A unique identifier includes an identifier (Prose ID) assigned to the UE 100 to use the D2D proximity service, a telephone number, a MAC address, etc., for example. The signal sequence of a DMRS may be previously stored in the memory 150.

The signal sequence of a DMRS is determined on the basis of the unique identifier, and thus, it is possible to lessen a possibility of overlapping the signal sequence of a DMRS included in a Discovery signal of another UE 100. As a consequence, the UE 100 having received a plurality of Discovery signals becomes possible to receive a DMRS included in each of the plurality of Discovery signals.

It is noted that in the D2D physical channel, in order to effectively use a radio resource, a D2D preamble not including data information for adjusting transmission power may not be included in a head symbol.

(Operation According to Embodiment)

Figure 7:
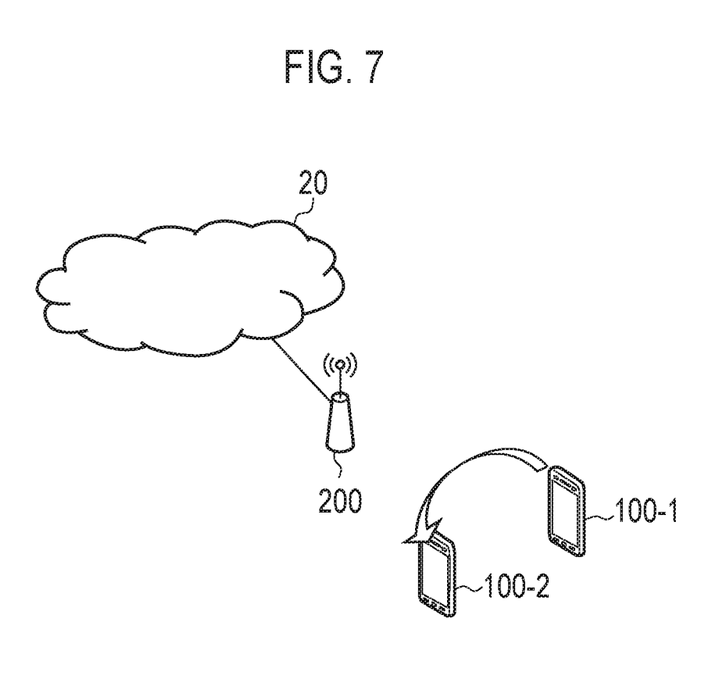
FIG. 7 is a diagram for describing an operation according to the embodiment.

Next, an operation according to the embodiment will be described by using FIG. 7. FIG. 7 is a diagram for describing an operation according to the embodiment.

As shown in FIG. 7, a UE 100-1 transmits a Discovery signal. Specifically, the UE 100-1 uses an HARQ scheme to repeatedly transmit a Discovery signal. That is, the UE 100-1 retransmits a Discovery signal (specifically, transmits a Discovery signal having an encoding bit string different from a first Discovery signal and the same content as the first Discovery signal) to repeatedly transmit a Discovery signal.

It is noted that the UE 100-1 may use an HARQ scheme (so-called Blind HARQ scheme) not receiving a transmission acknowledgment (Ack/Nack) of a Discovery signal. In this case, the UE 100-1 may determine the number of times of re-transmissions (the number of HARQs).

The UE 100-1 repeatedly transmits a Discovery signal including a DMRS. Here, the UE 100-1 unchangingly maintains the signal sequence of a DMRS, for each transmission. Therefore, the signal sequence of a DMRS included in the first Discovery signal and the sequence of a DMRS included in the retransmitted Discovery signal are the same.

It is noted that before starting transmitting the Discovery signal, the UE 100 determines the signal sequence of a DMRS and uses the determined signal sequence of a DMRS. Alternatively, the UE 100 uses the signal sequence of a DMRS stored in the memory 150.

On the other hand, a UE 100-2 existing proximately to the UE 100-1 receives a Discovery signal from the UE 100-1. The UE 100-2 does not know a DMRS signal sequence included in the Discovery signal, and thus, the UE 100-2 attempts to receive all the possible signal sequence patterns of a DMRS until correctly receiving (detecting) a DMRS. Thereafter, the UE 100-2 demodulates and decodes the Discovery signal on the basis of the correctly received DMRS.

The UE 100-2 receives a Discovery signal retransmitted from the UE 100-1 when decoding a Discovery signal is unsuccessful. The UE 100-1 does not change the signal sequence of a DMRS, for each transmission, and thus, the signal sequence of a DMRS included in the retransmitted Discovery signal is the same as the signal sequence of a DMRS included in the first Discovery signal. Therefore, the UE 100-2 can easily receive a DMRS, and thus, it is possible to restrain an increase in processing load of the UE 100-2.

The UE 100-2 performs a soft combining where the first Discovery signal and the retransmitted Discovery signal are combined and decoded. Further, when decoding is not possible, the UE 100-2 combines the first Discovery signal and the retransmitted Discovery signal with a further retransmitted Discovery signal for decoding. Thus, the UE 100-2 performs the soft combining to improve the receiving success rate of the Discovery signal. The UE 100-2 correctly receives the Discovery signal to discover the UE 100-1.

[Other Embodiments]

In the aforementioned embodiment, as one example of a mobile communication system, the LTE system is described; however, the present invention is not limited to the LTE system, and the contents of the present invention may be applied to a system other than the LTE system.

In addition, the entire content of U.S. Provisional Application No. 61/990,988 (filed on May 9, 2014) is incorporated in the present specification by reference.

[Additional Statement]

(1) Introduction

D2D preamble and Gap design was discussed. In the Additional statement, we consider the necessity of D2D preamble and Gap design.

(2) D2D Preamble

Whether the first symbol data is sufficient for AGC or whether a different preamble is needed is further discussed.

The necessity of D2D preamble was discussed. Using one symbol as D2D preamble has a significant impact on the link performance. Therefore, D2D preamble should not be supported.

Proposal 1: D2D preamble should not be supported from the link performance perspective.

(3) Gap Design

Agreement:

At least for UEs which are not out-of-coverage, the size of the gap, for both communication and discovery, is 1 symbol at the end of every D2D transmission which does not use uplink timing advance.

Whether a "D2D transmission" can in some cases be considered to have a duration of more than one sub-frame is for further study, and if so, in which cases.

A list of all relevant cases to identify which ones need a gap is prepared.

Gap is created by puncturing.

There is no explicit signaling of the presence/absence of the gap.

For D2D discovery, the first discovery type (Type 1 discovery) needs gaps at least for UEs which are not out-of-coverage. To reduce the impact of D2D discovery, gaps should be inserted only at the first discovery type transmission and WAN transmissions and at the first and the second discovery type transmission.

Proposal 2: To reduce the impact of D2D discovery, gaps should be inserted only at the first discovery type transmission and WAN transmissions and at Type 1 and Type 2 discovery transmissions.

(4) RE Mapping of D2D Broadcast Communication and Discovery Signal

Discussion below is continued.

The PUSCH RE mapping

For discovery only, whether DMRS cyclic shift is chosen randomly every transmission To keep it simple, the PUSCH RE mapping should be reused for D2D discovery and D2D communication.

Proposal 3: PUSCH's RE mapping should be reused for D2D discovery and D2D communication.

(5) DMRS Cyclic Shift for D2D Discovery

For discovery, cyclic shift randomization is useful for improving the link performance. It is proposed that cyclic shift of DMRS transmitted by a UE should vary across discovery periods in a pseudo-random manner that is dependent on the identity of the UE. However, if the soft-combing repetition of D2D discovery is supported for improving the link performance, random selection of each transmission per UE results in higher receiver complexity due to increase in the number of possible DMRS patterns. Therefore, it is preferable to fix the cyclic shift which is dependent on the UE ID.

Proposal 4: For D2D Type 1 discovery scheme, cyclic shift should be fixed and dependent on the identity of the UE.

INDUSTRIAL APPLICABILITY

As described above, according to the user terminal and the processor according to the present embodiment, it enables improvement of a receiving success rate of a discovery signal while reducing a processing load of a reception-side user terminal, and thus, they are useful in the mobile communication field.

The invention claimed is:

1. A user terminal comprising:
a controller including a processor and a memory coupled to the processor, the processor configured to
determine a signal sequence of a demodulation reference signal, on the basis of a unique identifier assigned to the user terminal for device to device (D2D) proximity service;
transmit a D2D discovery signal including the demodulation reference signal, the D2D discovery signal being for discovering a proximal terminal;
repeatedly transmit the D2D discovery signal including the demodulation reference signal by using a HARQ scheme, wherein
the processor is further configured to unchangingly maintain the signal sequence of the demodulation reference signal, for each transmission of the D2D discovery signal.

2. An apparatus provided in a user terminal, the apparatus comprising a processor and a memory coupled to the processor, wherein
the processor is configured to
determine a signal sequence of a demodulation reference signal, on the basis of a unique identifier assigned to the user terminal for device to device (D2D) proximity service;
transmit a D2D discovery signal including the demodulation reference signal, the D2D discovery signal being for discovering a proximal terminal;
repeatedly transmit the D2D discovery signal including the demodulation reference signal by using a HARQ scheme; and
unchangingly maintain the signal sequence of the demodulation reference signal, for each transmission of the D2D discovery signal.

* * * * *